MOORE & BOWER.
Candle Mold.
No. 136. Patented March 3, 1837.
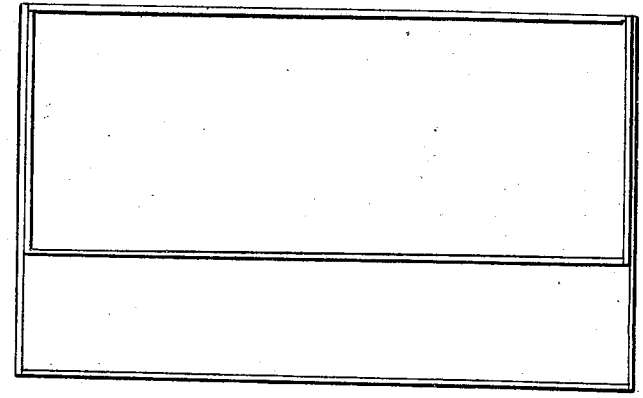

UNITED STATES PATENT OFFICE.

JOHN MOORE AND SAMUEL P. BOWER, OF STRASBURG, PENNSYLVANIA.

MODE OF MOLDING CANDLES.

Specification of Letters Patent No. 136, dated March 3, 1837.

*To all whom it may concern:*

Be it known that we, JOHN MOORE and SAMUEL P. BOWER, of the borough of Strasburg, in the county of Lancaster and State of Pennsylvania, have invented a new and useful Improvement in Candle-Molds, of which we declare the following to be a full and exact description.

The nature of our invention consists in providing Joseph M. Yards's patent candle mold with top and bottom boards.

To enable others skilled in the art to make and use our invention, we will proceed to describe its construction and operation.

The size of the oblong frame of wood which we find most convenient for our use is 35 inches long, containing 32 molds varying in breadth according to the number of candles to the pound. The lower end of the mold when fixed in this oblong frame of wood is covered with two pieces of wood which are called the bottom boards. Each of them is three eighths of an inch in thickness in breadth the one an inch the other an inch and a quarter. A rabbet is cut in the side next to the mold in the broad one and in the opposite side of the narrow one so that when put together these pieces form one piece of two inches in breadth, and cover the lower end of the molds. A groove in the end pieces of the frame receives each end of these pieces. A notch only sufficient to receive the wick is made in the broad piece a little lower than the depth of the rabbet opposite the center of each mold, and likewise a small notch in the narrow one just as deep as that below the rabbet in the broad piece. When the molds are about to receive wicks the frame is laid on a stationary frame the broadest of the two last described pieces is allowed to remain in its groove, and the narrow piece is removed. Wires fixed in a piece of wood and hooked at their ends as usual, are placed into the notches of the bottom board and forced through the molds to the upper end. Two other pieces of wood called the top boards of nearly the length of the frame one of which is about one inch square, with short wire points projecting at equal distances to suit the center of each of the molds, this piece is laid distant the length of the candle-wick from the top of the molds on the corners of the sliding frame as usual. The wick is fastened on these pins and on the corresponding wire hooks. When the wire hooks are removed out of the molds by the sliding frame this top board follows into its place and now serves to form one side of the trough into which the tallow is poured. The other side of the trough is formed by a thin board let into a groove fitting close to the frame. Now the narrow bottom board is put into its groove and uniting with the broadest holds the wick tight and prevents the tallow from escaping. The wire hooks are removed and the mold is turned from a horizontal to a perpendicular position and filled with tallow. When ready to draw the top and bottom boards are removed and a pressure on the top of each candle they are moved downward and drawn out at the bottom or opposite end from that in which the tallow was poured.

What we claim as our invention and desire to secure by Letters Patent is—

The top and bottom boards above described. The peculiar advantages arising from the application of these top and bottom boards to Mr. Yards's patent candle molds are the simplicity and expeditious manner in which they can be applied to the purposes for which they are intended.

JOHN MOORE.
SAML. P. BOWER.

Witnesses:
MARTIN B. RESSLER,
ISAAC GIVIN.